Sept. 7, 1954    M. J. MICHEL    2,688,161
MECHANISM FOR PROCESSING FIBERS
Filed June 16, 1950    2 Sheets-Sheet 1
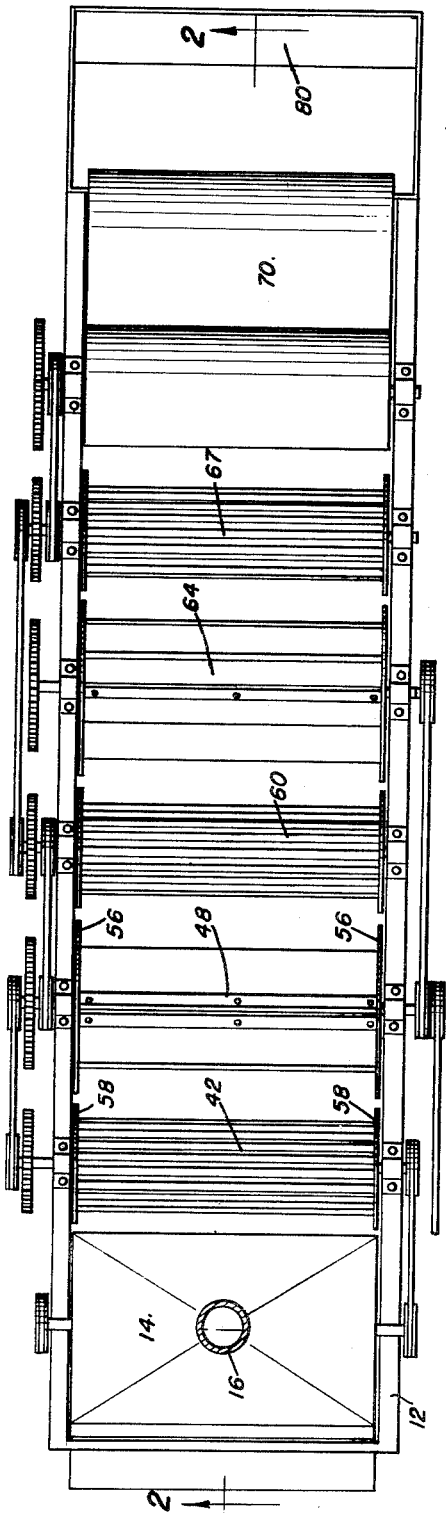
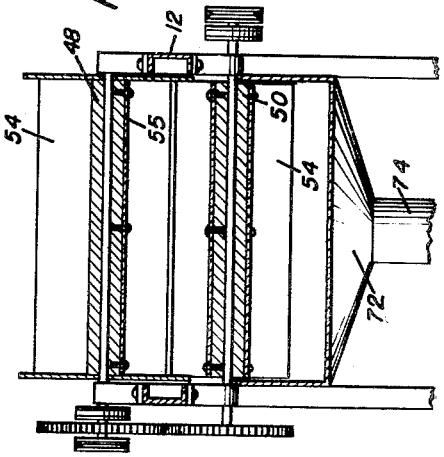
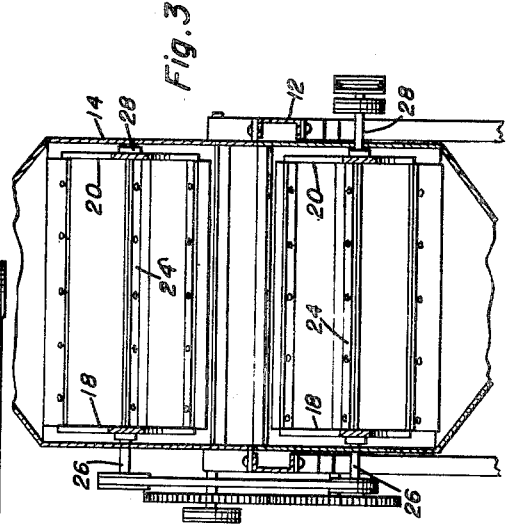
Maurice J. Michel
INVENTOR.
BY

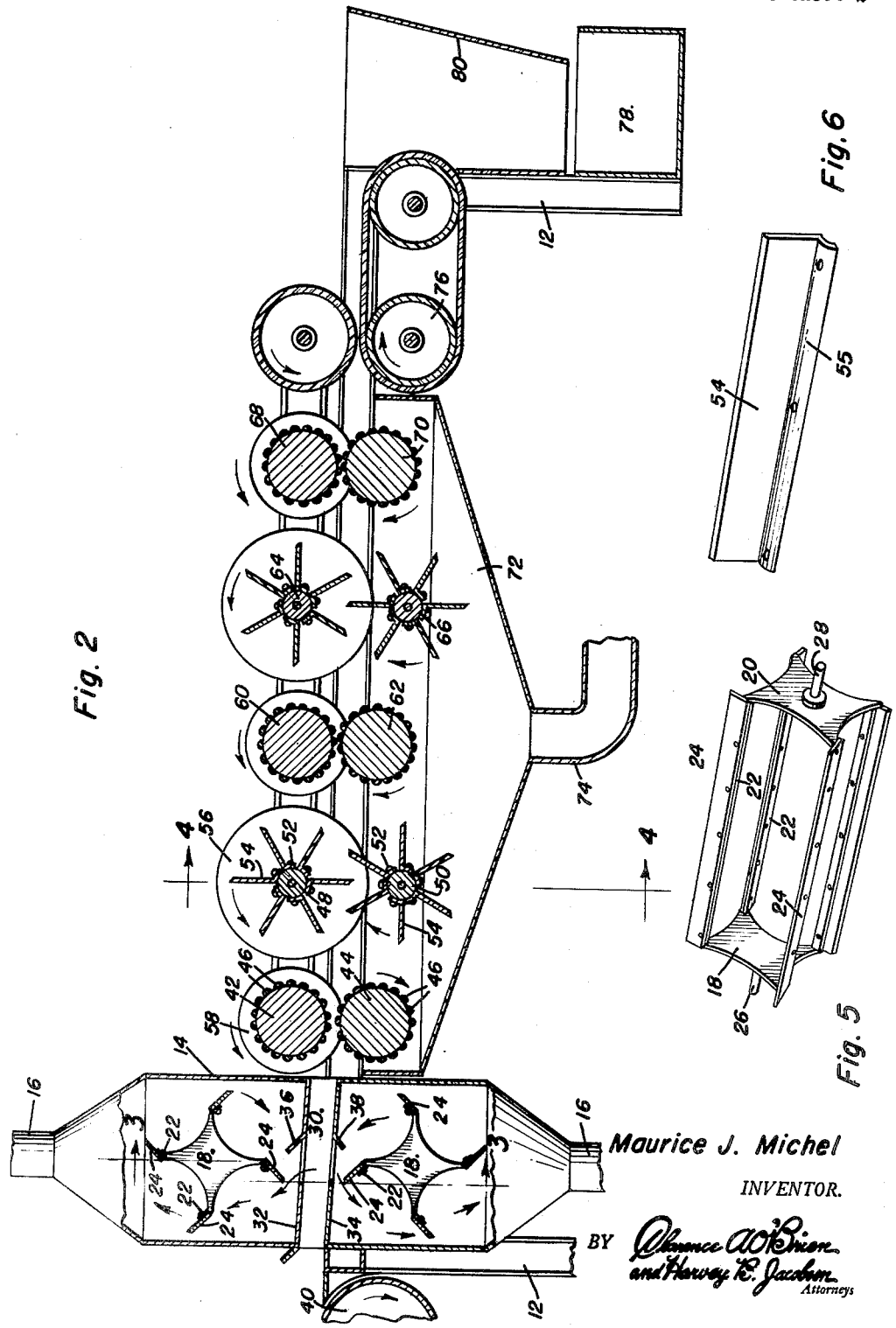

Patented Sept. 7, 1954

2,688,161

UNITED STATES PATENT OFFICE 2,688,161

MECHANISM FOR PROCESSING FIBERS

Maurice J. Michel, New Orleans, La.

Application June 16, 1950, Serial No. 168,413

2 Claims. (Cl. 19—6)

This invention relates to a mechanism for treating fibrous material and more particularly to apparatus for breaking and scraping fiber stalk material.

An object of this invention is to provide a mechanism that will simply and easily remove the leaves from the stalks of fibrous material in order that the stalks may be further acted upon.

Another object of the invention resides in the provision of means for breaking stalks without crushing them and then scraping the fiber from the stalks while removing about 65% of the gum or sap while doing the least possible damage to the fiber itself.

A further object of this invention is to provide means for breaking the stalks of fibrous material without crushing or completely severing the stalks.

Still another object of this invention is to provide a mechanism having revolving scraper units which are adapted to remove residue of pieces of stalks or pith from the fibrous material which is being acted upon.

Still further objects of the invention reside in the provision of a combination mechanism for treating fibrous material that includes means for removing the leaves from the stalks, means for breaking the stalks and means for scraping the fibers of the stalks.

These, together with the various ancillary objects of the invention which will become apparent as the following description proceeds, are attained by this mechanism for processing fibers, a preferred embodiment of which has been illustrated in the accompanying drawings, by way of example only, wherein:

Figure 1 is a top plan view of the device comprising the present invention;

Figure 2 is a vertical sectional view as taken along the line 2—2 in Figure 1;

Figure 3 is a vertical sectional detail as taken along the line 3—3 in Figure 2;

Figure 4 is a vertical sectional view as taken along the line 4—4 in Figure 2;

Figure 5 is a perspective view of one of the cutting blades which are rotatably mounted in the housing of the deleafing mechanism;

Figure 6 is a perspective view of one of the blades which are adapted to be attached to a suitable cylinder and which form part of the scraping mechanism included in the invention.

With continuing reference to the accompanying drawings wherein like reference numerals designate similar parts throughout the various views, reference numeral 10 generally designates this processing apparatus which comprises the present invention. This apparatus includes a frame structure as indicated at 12 which is formed from suitable channel members, though other construction may be readily used.

Mounted on the frame 12 is a housing 14 which is rectangular in cross-section and which at the upper and lower ends thereof is reduced to cylindrical portions as indicated at 16 to which suction means including an exhaust fan may be operatively connected. Journaled in the housing are revolving cutters which include spaced metal plates 18 and 20 to wihch there are welded rods 22. To the rods 22 there are detachably bolted a plurality of cutting blades 24 which are bolted to the rods 22 for ready detachment in order that the blades may be sharpened when necessary. Extending from the plates 19 and 20 are ends of shafts 26 and 28 which are rotatably mounted in the housing 14.

A passageway 30 is formed through the housing 14 and is defined by guide plates 32 and 34 which are provided with flanges 36 and 38 for preventing stalks which are delivered by the rotary conveyor 40 from being drawn into the housing while the suction is being applied and while the blades 24 are stripping the stalks of the leaves thereon.

After passing through the passageway 30 the stalks are positioned between a first set of opposed rollers 42 and 44 which are adapted to break the stalk without crushing it. These rollers are formed from a cylinder which has welded thereto iron bars 46. The rollers 42 and 44 are spaced from each other a suitable distance so as to readily break the stalks into relatively small portions without crushing them.

Rotatably mounted on the frame 12 adjacent the rollers 42 and 44 are cylinders 48 and 50 to which there are attached by means of bolts 52 suitable cutter blades 54 which are provided with an offset portion 55 having a radius similar to the radius of the cylinders 48 and 50. The cylinders 48 and 50 together with the blades 54 form revolving scraper units which while not actually meshing as gears and while allowing a sufficient space between the blades for the fiber to be scraped without being caught or wedged between any solid parts of metal, remove pieces of stalk or pith from the fiber and in addition scrape the fiber.

Suitable disks 56 are secured at the ends of the cylinder 48 as are disks 58 which are secured to the ends of the upper roller 42. The disks 58 and 56 prevent the fiber from working off the rollers and the scraping elements.

Another set of spaced rollers 60 and 62 are secured on the frame 12 and are constructed in an identical manner to the rollers 42 and 44. The rollers 60 and 62 are spaced from each other a lesser distance than the rollers 42 and 44 are spaced. Likewise, scraping elements 64 and 66 are rotatably mounted on the frame 12 as are rollers 68 and 70. The rollers 68 and 70 are spaced closer together than either set of rollers 60 and 62 or 42 and 44. Thus, a progressively small space between the breaking rollers is provided which will both tend to insure that the stalks and fibers are conveyed and which will also serve to insure that the stalks are properly broken.

Below the rollers and scraping elements there is provided a disposal pan 72, which tapers downwardly to a cylindrical shape as at 74 which is connected to an exhaust pump for removing the waste material about the fibers. A belt conveyor mechanism 76 is provided for carrying the fiber for depositing such in a receptable 78 below a delivery shute 80 which is secured to the frame 12.

The rollers and the scraping elements are driven by suitable pulley elements and the scraper units are driven at a speed of about three times that of the breaker rollers. Thus, adequate scraping is provided while the fiber and stalks are held in the breaker rollers.

In operation, the plants or stalks are brought in from the fields and are placed on a suitable platform whence the conveyor 40 urges them in the guideway 30. The stalks are placed lengthwise and when drawn into the housing 14 the knives 24 deleaf the stalks. These leaves are cut into pieces by the knives and are drawn by suitable suction means through the conduit 16. Then, the stalks pass between the rollers 42 and 44 which break the stalks or pith of the plants into small lengths without injuring the fiber and in this broken stage the stalk or pith still adhering to the fibers is caught up and carried through the revolving scrapers 48 and 50 which remove pieces of stalk or pith from the fibers and pass the partially decorticated fibers onto the adjacent breaking rollers 60 and 62 which then further break those pieces of pith or stalks still adhering to the fibers and thence the fibers pass to the scrapers 64 and 66 and subsequently to the breaker rollers 68 and 70. The rollers 68 and 70 grip the fiber and pass it to the conveyor 76 and subsequently into the hopper 80 from whence it falls into the container 78 from where it is taken for further processing.

During this processing of the fibers a goodly portion of the gum or sap contained in the fiber will be removed. There is sufficient tension on the fiber that the blades making contact therewith spread the fiber out along the edges of the blades thus giving the effect of individual fiber scraping.

Since from the foregoing the construction and advantages of this apparatus for processing fiber are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

Having described the invention, what is claimed as new is:

1. A mechanism for processing fibers comprising carrying means for urging stalks to travel longitudinally into said mechanism, means for removing leaves from said stalks, suction means for gathering said leaves for subsequent disposal, said means for removing leaves from said stalks including a housing, cutting blades rotatably mounted in said housing, means for driving said blades, a guideway formed in said housing, and deflecting flanges in said housing for preventing stalks from being drawn by said suction means from engagement with said guideway.

2. For use with a machine for removing fibers from stalks, a deleafing device comprising a housing, suction connections to the upper and lower ends of said housing, spaced apart guide plates extending transversely of said housing, means for urging stalks between said guide plates, said guide plates having leaf receiving passages therein, said connections when having suction applied thereto being operative to draw leaves through said passages, deflecting flanges adjacent said passages for preventing stalks from being drawn through said passages by said suction, and revolving cutters mounted in proximity to said passages.

References Cited in the file of this patent

UNITED STATES PATENTS

| Number | Name | Date |
|---|---|---|
| 4,075 | Deering | June 10, 1845 |
| 342,631 | Raabe et al. | May 25, 1886 |
| 442,735 | Stewart | Dec. 16, 1890 |
| 471,097 | Brown | Mar. 22, 1892 |
| 716,587 | Smith | Dec. 23, 1902 |
| 792,059 | De Montlord | June 13, 1905 |
| 905,345 | Mudge | Dec. 1, 1908 |
| 1,010,006 | Worth | Nov. 28, 1911 |
| 1,308,376 | Schlichten | July 1, 1919 |
| 2,208,287 | Cochrane | July 16, 1940 |
| 2,355,999 | Patterson | Aug. 15, 1944 |